(12) United States Patent
Hernandez

(10) Patent No.: US 7,470,220 B2
(45) Date of Patent: Dec. 30, 2008

(54) BICYCLE MOUNTED EXERCISE AND TRAINING DEVICE

(76) Inventor: Ricardo Hernandez, 2730 SW. 20th St., Miami, FL (US) 33145

( * ) Notice: Subject to any disclaimer, the term of this patent is extended or adjusted under 35 U.S.C. 154(b) by 55 days.

(21) Appl. No.: 11/688,514

(22) Filed: Mar. 20, 2007

(65) Prior Publication Data

US 2008/0234112 A1    Sep. 25, 2008

(51) Int. Cl.
*A63B 69/16* (2006.01)
*B62J 39/00* (2006.01)
*B62L 5/10* (2006.01)

(52) U.S. Cl. ............... 482/63; 482/57; 280/288.4; 188/25

(58) Field of Classification Search ............ 482/57, 482/60, 61, 63, 65, 900; 280/288.4, 293, 280/298, 304.2; 188/24.22, 25, 26, 27
See application file for complete search history.

(56) References Cited

U.S. PATENT DOCUMENTS

| 3,192,772 | A | * | 7/1965 | Tarter | 73/379.07 |
| 4,364,557 | A | * | 12/1982 | Serati | 482/65 |
| 4,423,863 | A | * | 1/1984 | Figueroa | 482/62 |
| 4,521,010 | A | * | 6/1985 | Hahn | 482/65 |
| 6,749,543 | B2 | * | 6/2004 | McLaughlin | 482/57 |

* cited by examiner

*Primary Examiner*—Fenn C. Mathew
*Assistant Examiner*—Andrew M Tecco
(74) *Attorney, Agent, or Firm*—Michael C. Cesarano; Feldman Gale P.A.

(57) ABSTRACT

A bicycle trainer is a bicycle-mounted apparatus used to produce friction to resist the turning of a wheel of a bicycle, thereby requiring the rider to exert more energy than would otherwise be necessary. The bicycle trainer is adjustable by the rider while riding, and can simulate hill or mountain climbing at any positive grade.

10 Claims, 6 Drawing Sheets

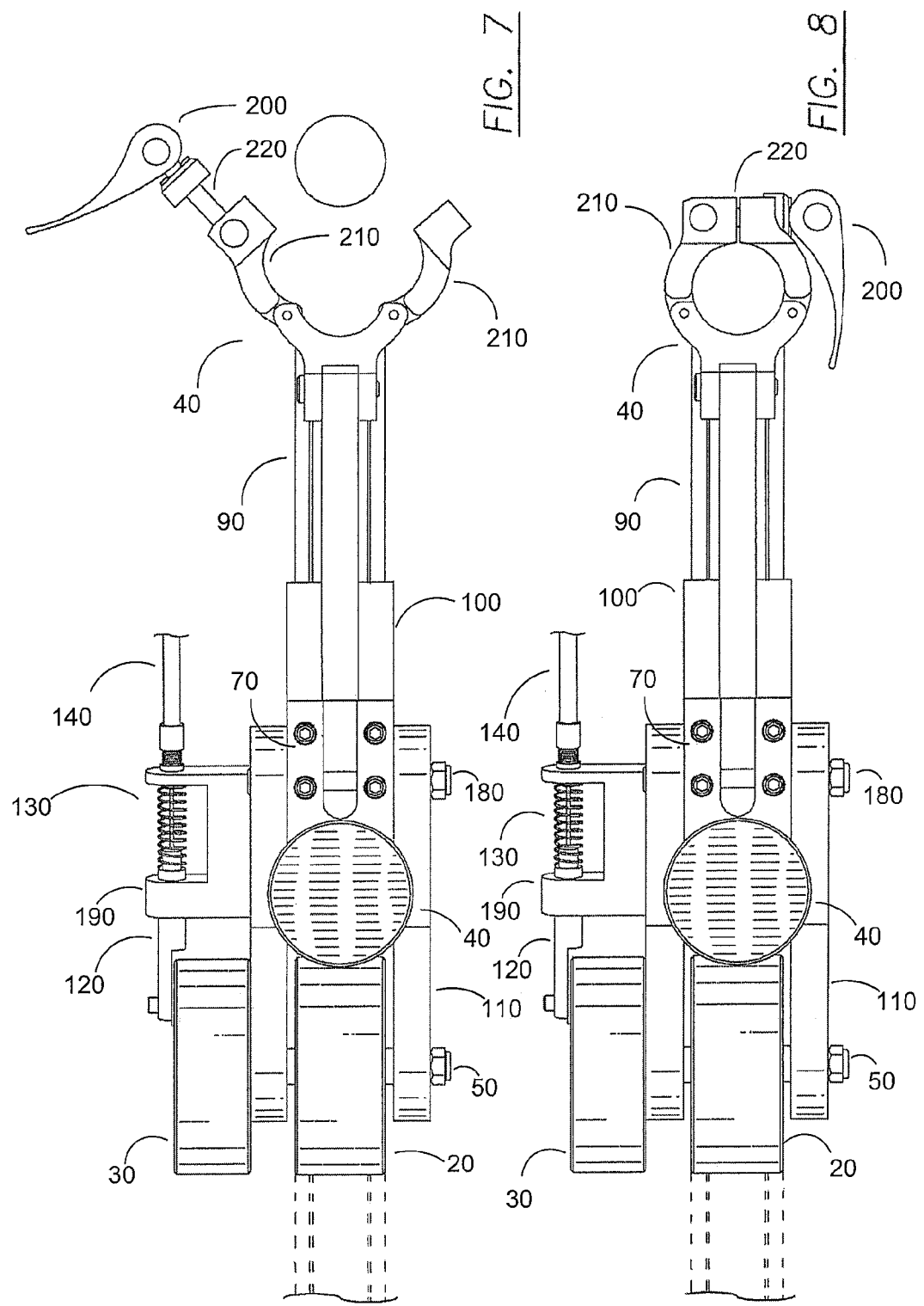

BICYCLE MOUNTED EXERCISE AND TRAINING DEVICE

This invention is a bicycle-mounted exerciser that provides an adjustable, variable resistance to a bicycle wheel, thereby requiring a bicycle rider to exert more or less energy to pedal the bicycle. By working against a resistance, a bicycle rider can get exercise and training for leg strength and overall endurance as part of a physical training program while riding a bicycle. The exerciser device is mounted to the post supporting the bicycle seat, and is adjustable to enable a friction wheel to be pressed downward against the bicycle's driving wheel with sufficient force to substantially eliminate slippage between the bicycle's driving wheel and the exerciser's friction wheel. If desired, the exercise device may be raised above the bicycle wheel to allow the driving wheel to turn without being in contact with the exercise device.

BACKGROUND OF THE INVENTION

Many kinds of exercise devices have been used on bicycles and other pedal-operated equipment to artificially increase resistance to pedaling whereby a rider will have to exert greater force upon the bicycle pedals in order to turn them. Some such devices are found in so-called "stationary" bicycles which are designed to be used in a gymnasium or other enclosed area, and which serve the sole purpose of providing resistance to a pedaling movement. Other exercise devices have been designed as stationary platforms for standard bicycles that can be placed upon the platform to provide resistance to pedaling. Because stationary bikes and standard bicycles placed upon a stationary platform are not mobile, and are used within a controlled physical space, the friction generating mechanisms can be as large, heavy, or intricate as may be required to provide the necessary resistance to motion. However, bicycles are primarily used for traversing terrain, and many riders enjoy the freedom of being able to cover distances on a bicycle while also obtaining exercise. For such riders, a suitable exercise device must be mounted upon the bicycle and must be operable by a rider under varying conditions of speed and terrain. For a bicycle-mounted exercise device, factors such as weight, simplicity of operation, ruggedness, and efficiency in dissipating heat that is generated through the friction of restraining the circular motion of the bicycle driving wheel take on added importance.

SUMMARY OF THE INVENTION

The exercise device of this invention is a seat-post mounted frame supporting a friction wheel and a braking wheel that are rigidly joined with a common axle. The friction wheel is held in non-slipping contact with a bicycle wheel while the braking wheel is subjected to a braking force applied through an adjustable brake pad. Although it is preferred that the friction be in non-slipping contact with the rear (driving) wheel of a bicycle, the device will provide adequate resistance to pedaling when placed in non-slipping contact with a non-driving bicycle wheel. The rotation of the exerciser's braking wheel is retarded by a brake pad mounted within the braking wheel. The brake pad has a linkage to a hand lever operated by the rider for adjusting the amount of resistance to rotation being provided at any given time. A turn screw on the exercise device is used to adjust the downward force of the friction wheel against a wheel of the bicycle to ensure sufficient pressure to avoid slippage during operation of the exercise device. When the exercise device is not being used, the turn screw can be adjusted to hold it out of the way, above the driving wheel.

BRIEF DESCRIPTION OF THE DRAWINGS

FIG. 7 is a plan view of the exercise device with the mounting clamp in an open position.

FIG. 8 is a plan view of the exercise device with the mounting clamp closed and tightened.

DETAILED DESCRIPTION OF THE PREFERRED EMBODIMENTS

Figure 1:
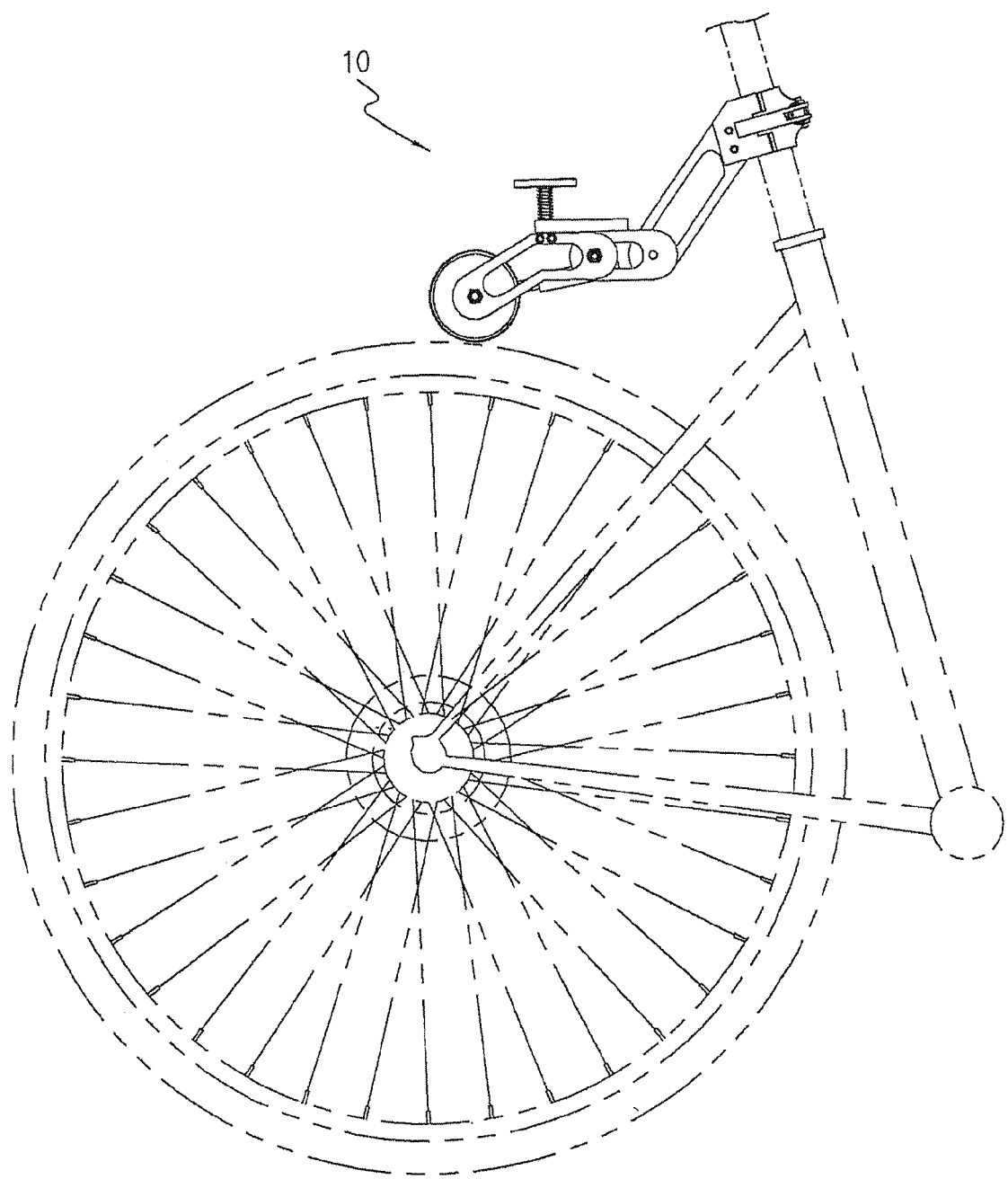
FIG. 1 is a right elevational view showing the exercising device in relation to a bicycle rear wheel and seat mounting post.

As shown in FIG. 1, the exercise device of this invention 10 is mounted on a bicycle by being attached to the bicycle seat post where it can be positioned in relation to the rear wheel of a bicycle. An adjustment turn screw 40 may be tightened to press the device against the bicycle wheel, or may be released to relieve the downward pressure and permit the device to be raised above the bicycle wheel.

Figure 2:
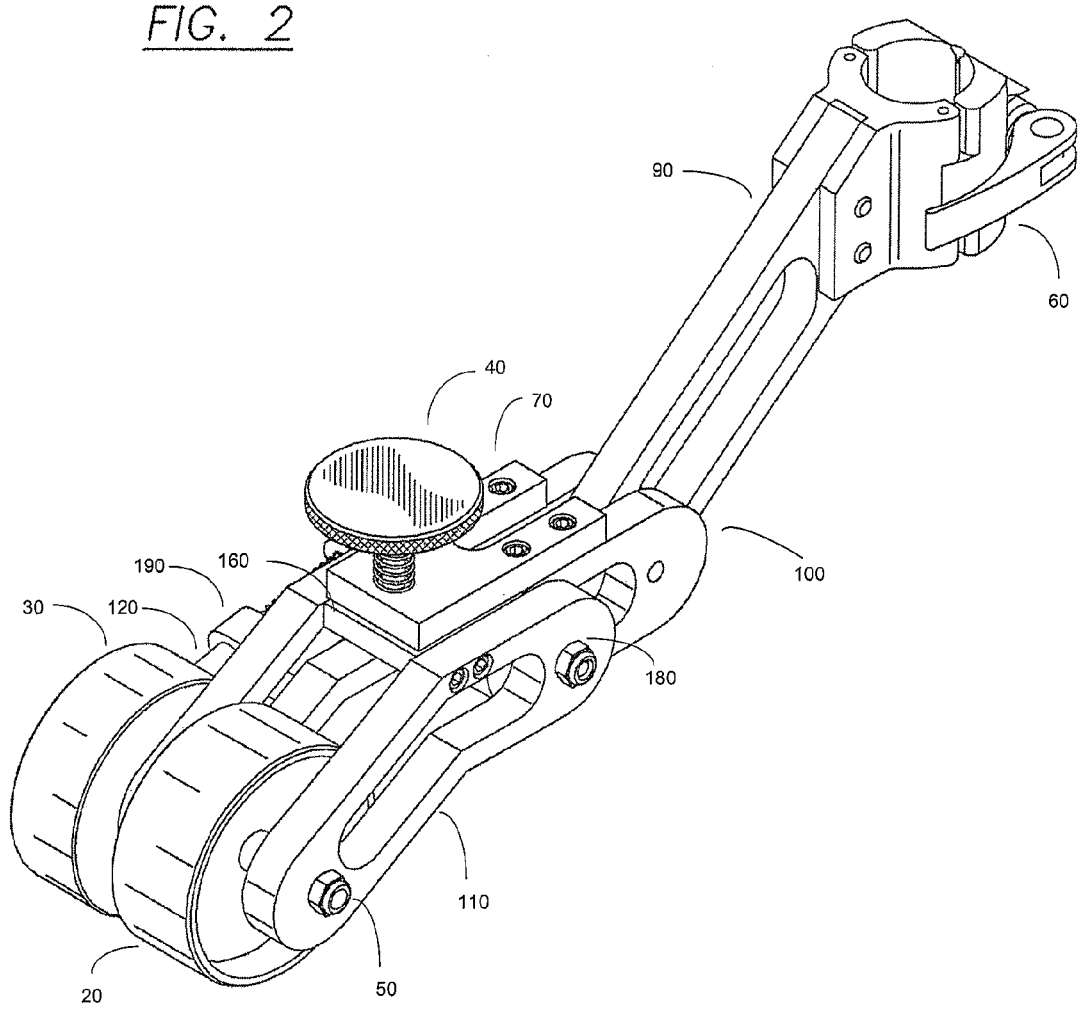
FIG. 2 is a perspective view of the exercise device of this invention.

FIG. 2 shows the exercise device in perspective view. A friction wheel 20 and a braking wheel 30 are maintained in rigid co-axial relationship upon a single axle 50. The friction wheel is in contact with the bicycle tire during operation. Although the diameters of the friction wheel 20 and the braking wheel 30 are shown as being substantially equal in FIG. 2, this is not a requirement for acceptable operation of the exercise device, and the braking and friction wheels of the device may be of different sizes in order to achieve a desired combination of rotational speed and braking forces.

The exercise device has three framing pieces that may be adjusted to properly position the friction and braking wheels above the rear wheel of a bicycle. An upper frame 90 is rigidly attached to an adjustable clamp 60 that secures the device to the post of a bicycle seat. Middle frame 100 is securely fastened to upper frame 90. Middle frame 90 also includes an adjustment bracket 70 through which is threaded a turn screw 40 that is used to make fine adjustments to the positioning of the friction wheel 20 upon a bicycle tire. Lower frame 110 is pivotably joined to middle frame 100 at pin 180, and has a pressure plate 160 rigidly attached to the lower frame below tuna screw 40. Brake piston 120 and brake cylinder 190 are visible adjacent to lower frame 110.

As seen in FIG. 2, the upper frame 90, middle frame 100, and lower frame 110 have large open cavities which result in an overall weight reduction for the device. Strong, lightweight materials are desirable, as they provide sufficient retarding forces when the device is applying friction, yet do not otherwise hinder operation of the bicycle when the device is raised to eliminate additional friction that is supplied by the exercise device.

Figure 5:
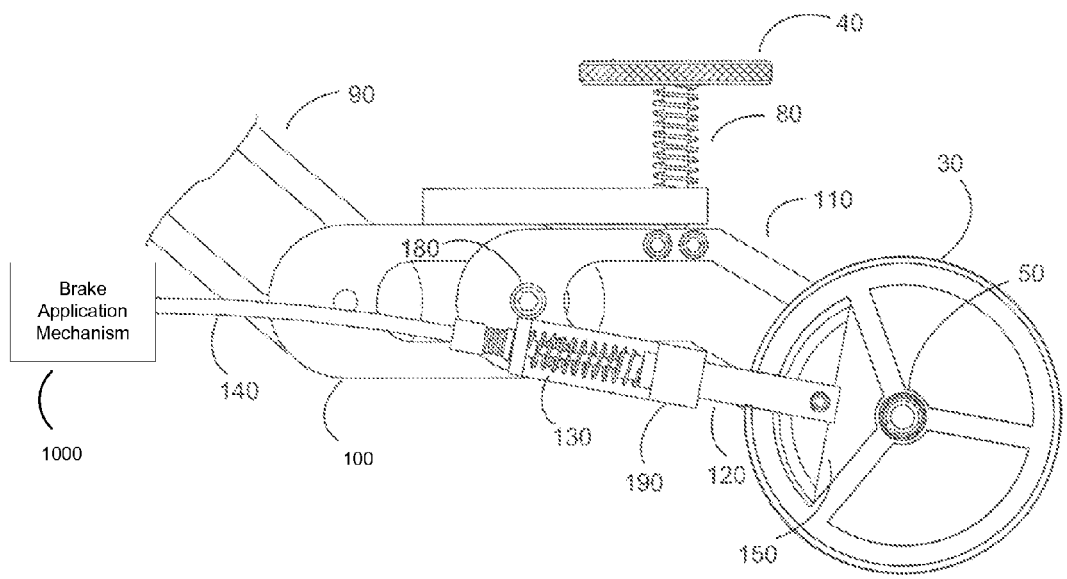
FIG. 5 is a left elevational view showing the braking wheel with the spring linkage holding the brake pad away from contact with the braking wheel.

As shown in FIG. 5, lower frame 110 securely supports braking wheel 30 and friction wheel 20 while permitting them to rotate together, and also supports the braking assembly comprising brake piston 120, brake spring 130, brake cable 140, brake cylinder 190, and brake pad 150. In FIG. 5, brake pad 150 is being held away from contact with the inner portion of braking wheel 30 by brake spring 130, allowing braking wheel 30 to rotate freely. Also, FIG. 5 shows the braking wheel being a spoked wheel, rather than a solid disc, thereby reducing the mass of the wheel and the overall weight of the exerciser.

Figure 6:
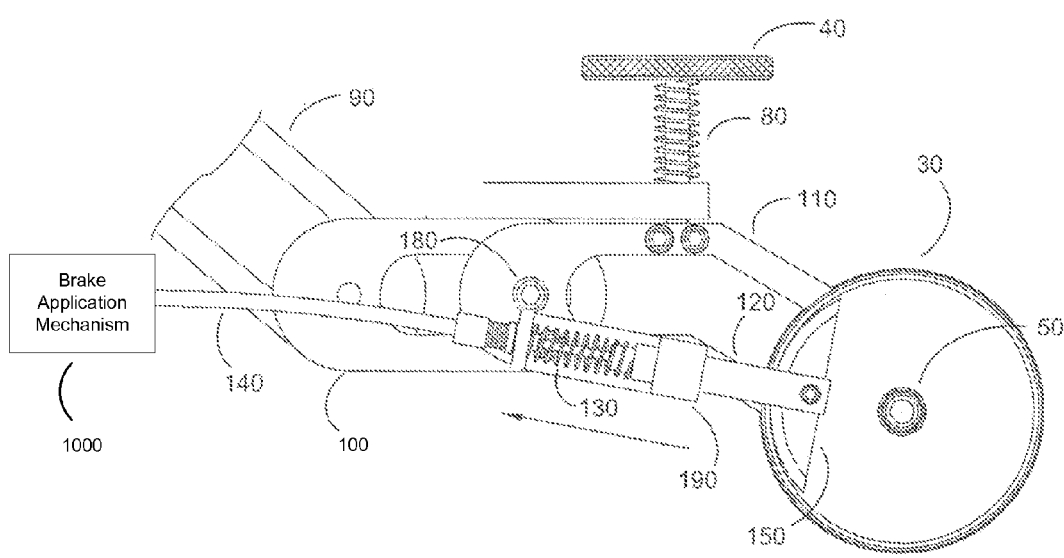
FIG. 6 is a left elevational view showing the brake pad being pressed into operating engagement with the braking wheel.

FIG. 6 shows brake pad 150 being drawn against the inner circumference of braking wheel 30 when brake cable 140 is tightened. A conventional hand lever or turning knob 1000 can be mounted on the bicycle handle bars or some other convenient location, and may be adjustable to increase or decrease resistance to the rotation of braking wheel 30 and, through axle 50, with friction wheel 20. As brake pressure is applied, resistance causes the braking wheel 30 to transmit a retarding force to the friction wheel 20 through common axle 50, thereby placing additional resistance upon the friction wheel 20 and the bicycle tire, requiring the rider to exert more effort while riding and obtain the desired exercise and training.

Figure 3:
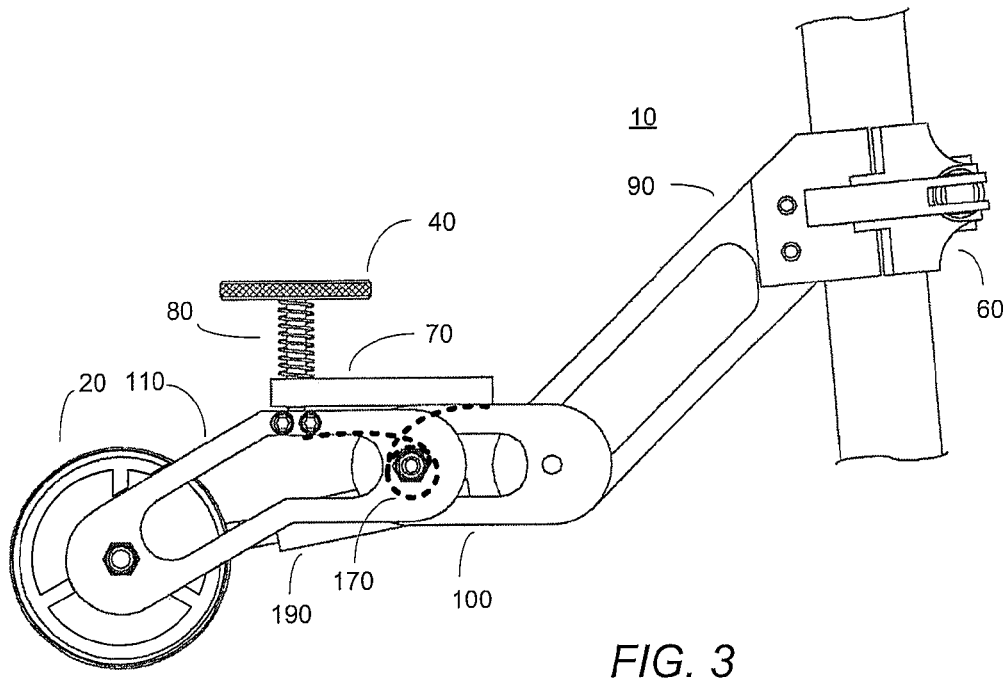
FIG. 3 is a detailed right elevational view depicting the friction wheel of the exercise device being held out of contact with a bicycle tire.
Figure 4:
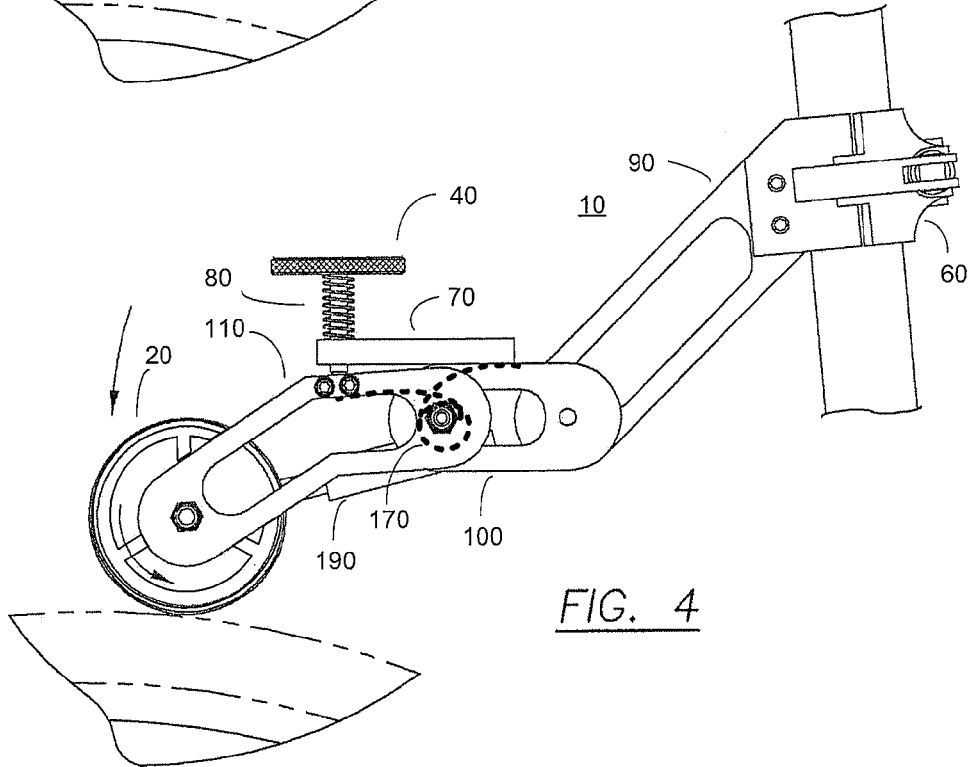
FIG. 4 is a detailed right elevational view showing the friction wheel of the exercise device being held against a bicycle tire.

A turn screw 40 is threaded into adjustment bracket 70 which is rigidly attached to middle frame 100. Turn screw 40 protrudes downwardly to contact pressure plate 160 which is rigidly attached to lower frame 110. When tightened downwardly, turn screw 40 presses against pressure plate 160, causing lower frame 110 to pivot about pin 180 toward the bicycle tire, bringing friction wheel 20 into contact with the tire, as is depicted in FIG. 4. Pin 180 is a bolt having a locking nut that may be tightened or loosened, as circumstances require, to allow lower frame 110 to be pivoted about rotating pin 180 with a slight amount of force. FIG. 3 also shows a raising spring 170 (in phantom) behind middle frame 100. Raising spring 170 places upward pressure on lower frame 110 and holds pressure plate 160 against turn screw 40. When the friction wheel 20 is to be raised above the bicycle tire, turn screw 40 is backed partially out of adjustment bracket 70, allowing raising spring 170 to force lower frame 110 upwards. Friction wheel 20 will then be raised above the bicycle tire. FIGS. 3 and 4 depict the friction wheel as having spokes, although the friction wheel may be a solid disc, depending upon engineering preferences.

When the bicycle to which the exercise device is mounted is being operated over open terrain, turn screw 40 is subject to vibration that may cause unwanted tightening into adjustment plate 70, changing the setting previously applied by the rider, and increasing the pressure holding friction wheel 20 against the bicycle tire. To prevent such inadvertent tightening of the turn screw, a turn screw spring 80 may be coiled about the shaft of the turn screw, and will operate to counteract the force of gravity that would otherwise cause turn screw 40 to tighten.

The exercise device of this invention is portable from bicycle to bicycle, and has sufficient adjustment pins, levers, and screws to make it suitable for nearly all conventional bicycles. As is shown in FIGS. 7 and 8, a quick-release clamp 40 is used to secure the exercise device to the post of a bicycle seat. A cambered lever 200 is pivotally connected to a shaft 220 which is itself pivotally attached to one of two opposing clamp arms 210. Each of the clamp arms pivots between an open and closed position, depicted respectively in FIGS. 7 and 8. If desired, shaft 220 can be threaded to permit the distance between clamp arm 220 and cambered lever 200 to be lengthened or shortened to accommodate larger or smaller diameter bicycle seat posts. When clamp 40 is closed, as shown in FIG. 8, cambered lever 200 will pivot to an over-center position in which the clamp will remain closed until manually released.

Figure 9:
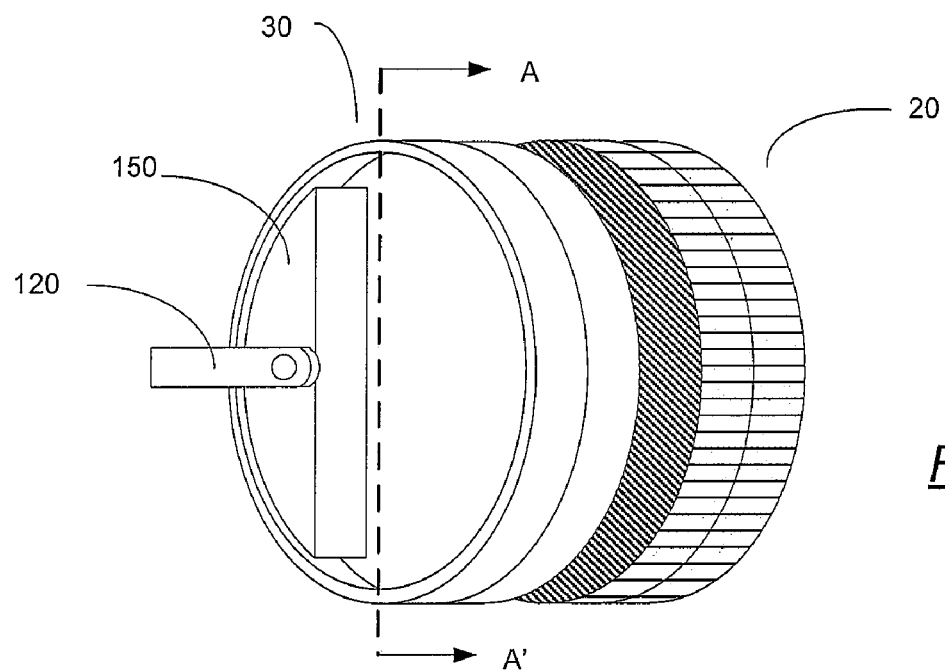
FIG. 9 is a detailed perspective view of the friction wheel and braking wheel of the invention.
Figure 10:
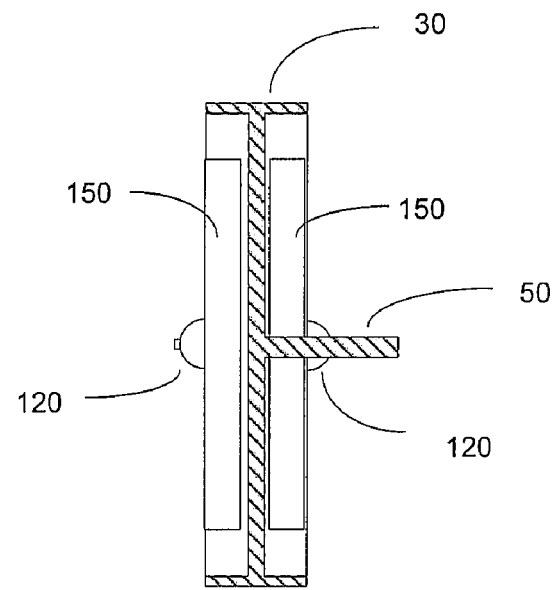
FIG. 10 is a cutaway front view of the braking wheel taken along plane A-A'.

A detailed depiction of the braking wheel 30 and the friction wheel 20 is given in FIG. 9. Friction wheel 20 may have an abraded or other non-slip circumferential surface to prevent slippage between friction wheel 20 and a bicycle tire. Friction wheel 30 has a cylindrical configuration extending around the circumference of the wheel. Brake pad 150 fits within the circumference defined by the inner cylindrical surface and, when activated through brake piston 120, will exert a frictional force against the inner portion of the cylindrical surface to retard rotation of the braking wheel. FIG. 10 shows a cutaway front view of the braking wheel taken along line A-A'. In one embodiment, the cylindrical surface of braking wheel 30 extends beyond the disc of the wheel on both sides of the disc to create spaces for brake pads 150 on both sides of the disc. This embodiment may be used where strong braking forces are desired, or to maintain symmetrical braking forces upon braking wheel 30. Where dual brake pads are used, brake piston 120 will attach to both brake pads using a "U" shaped harness, enabling both brake pads 150 to apply force to braking wheel 30 with a single movement of the brake cable 140.

It will be understood that the embodiments disclosed herein are exemplary, and that persons of ordinary skill may conceive additional embodiments not explicitly described herein, but which fall within the disclosure and scope of the invention. The invention is therefore limited only by the claims appended hereto.

I claim:

1. A bicycle-mounted exercise device comprising:
an adjustable clamp, an upper flame, a middle frame, a lower frame, a friction wheel, a braking wheel, a brake pad, and a brake application mechanism;
said adjustable clamp being configured to fixedly grasp the post of a bicycle seat;
said upper frame being connected to said clamp and extending downwardly to terminate at a lower end;
said middle frame being pivotably attached to said lower end of said upper frame and extending rearwardly,
said lower frame being pivotably attached to a rearward portion of said middle frame and having a pin extending through said middle frame and said lower frame, said lower frame having a rearmost portion with an opening therethrough, said lower frame supporting brake assembly comprising a brake cable and said brake pad;
an axle extending through said opening in said lower frame, said axle supporting said friction wheel and said braking wheel, said friction wheel and said braking wheel being rigidly connected and rotatable relative to said lower frame,
said friction wheel being positioned adjacent a bicycle tire,
said braking wheel comprising a hub and a cylindrical surface, said hub and said cylindrical surface being rigidly attached, said cylindrical surface having an inner surface and an outer surface;
said brake cable having a first end connected to a brake activation mechanism and a second end connected to said brake application mechanism, said brake activation mechanism comprising a brake piston and a brake cylinder, said brake piston extending through said brake cylinder and being movable with respect to said brake cylinder, said brake piston terminating at said brake pad and being securely attached thereto, said brake pad being positioned within said inner cylindrical surface of said braking wheel and radially movable in relation to said inner cylindrical surface, said brake pad moving into contact with said inner cylindrical surface and applying a retarding force against the rotational motion of said braking wheel upon said brake cable being tightened;

said braking wheel transmitting said retarding force to said friction wheel, said friction wheel transmitting a retarding force to the tire of a bicycle.

2. A bicycle mounted exercise device as claimed in claim 1, further comprising a turn screw, a raising spring, an adjustment bracket, and a pressure plate, said adjustment bracket being securely attached to said middle frame and having an opening therethrough, said turn screw being adjustable and protruding through said adjustment bracket;

said pressure plate being securely attached to said lower frame and being located below said turn screw, said raising spring being coiled around said pin and having ends pressing against said lower frame and said middle frame, said spring applying an upward force to said lower frame to cause said pressure plate to pivot upwardly and contact said turn screw.

3. A bicycle mounted exercise device as claimed in claim 2, said turn screw having a shaft, said shaft and said opening through said adjustment bracket being threaded, said shaft protruding through said opening by a predetermined amount, said shaft being manually adjustable within said opening through circular rotation of said turn screw, a spring coiled around said shaft and placing an upward force against said turn screw whereby, when said exercise device is vibrated, said predetermined amount of protrusion of said shaft will remain constant.

4. A bicycle mounted exercise device as claimed in claim 3, said upper frame, said middle frame, and said lower frame each comprising support members having open cavities between said support members.

5. A bicycle mounted exercise device as claimed in claim 4, said braking wheel further comprising a hub, a plurality of spokes, and an outer surface.

6. A bicycle mounted exercise device as claimed in claim 4, said friction wheel further comprising a hub, a plurality of spokes, and an outer surface.

7. A bicycle mounted exercise device as claimed in claim 6, said friction wheel further comprising a slip resistant outer surface where said friction wheel contacts a bicycle wheel.

8. A bicycle mounted exercise device as claimed in claim 1, said adjustable clamp comprising two pivotable arms configured to extend around a post, a cam lever, and a threaded shaft, said threaded shaft being longitudinally adjustable and having one end being pivotably attached to an end of a first said pivotable arm, the other end of said threaded shaft being attached to said cam lever, said cam lever being tightenable around an end of said second pivotable arm, whereby said adjustable clamp can be securely fastened to a bicycle.

9. A bicycle mounted exercise device as claimed in claim 3 said brake piston further comprising a harness having two arms, said arms extending to either side of said braking wheel and being movable with respect to said brake cylinder, said brake pad comprising two brake pads, said brake pads being situated on opposite sides of said braking wheel, each said arm terminating at one of said brake pads and being securely attached thereto whereby, upon the tightening of said brake cable, said brake pads move in unison to contact said inner surface of said braking wheel.

10. A bicycle mounted exercise device as claimed in claim 9, said braking wheel further comprising a heat conducting material to dissipate heat generated when the rotation of said braking wheel is retarded by the application of said brake pads.

\* \* \* \* \*